United States Patent Office 3,099,104
Patented July 30, 1963

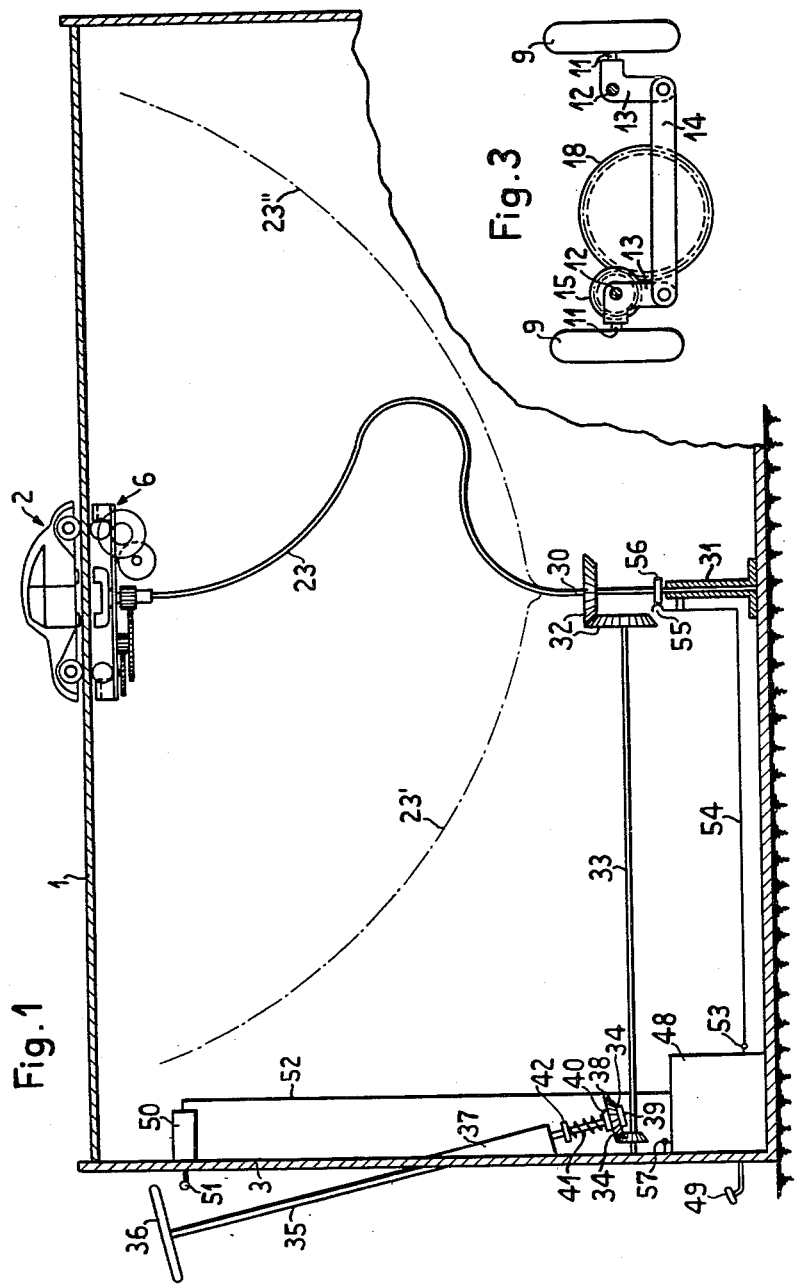

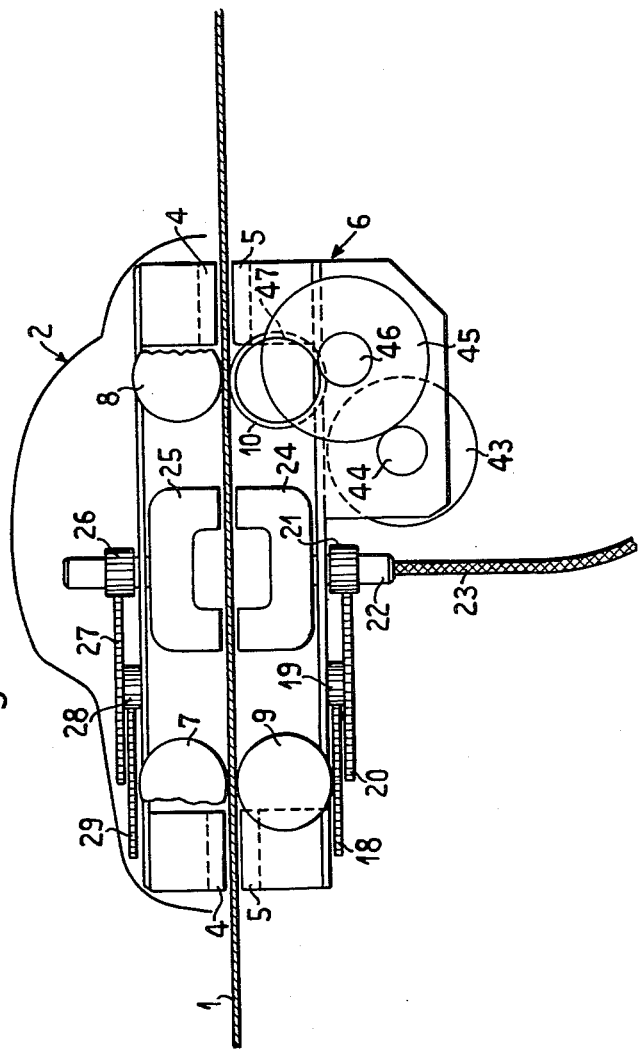

3,099,104
MECHANICAL TOY
Paul Rudolf, Bremgarten, Aargau, Switzerland, assignor to Gottlieb Stirnemann, Bremgarten, Aargau, Switzerland
Filed Jan. 13, 1961, Ser. No. 82,550
4 Claims. (Cl. 46—240)

The present invention relates to a mechanical toy comprising a plaform, a car having wheels arranged moveably on top of said platform, a carriage having wheels arranged moveably on the underside of said platform, magnets arranged in both the said car and carriage in juxtaposition with one another by their magnetic fields coupling the said car and carriage in juxtaposition with one another and by their magnetic fields coupling the said car and carriage to one another, driving means capable of driving the said carriage, and steering means mounted stationarily with respect to said platform and capable of steering the said carriage.

The invention has the object of providing a mechanical toy of the kind described which is of simple and inexpensive construction and, more particularly, dispenses with a movable gantry or slewing arm on which the said carriage runs at the underside of said platform, and whose movement is composed with the movement of said carriage relative to it, to produce the movement of the car on top of said platform, as used hitherto.

It is another object of the invention to provide a mechanical toy of the kind described, wherein the movements of the said steering means substantially correspond to the movements of the steering wheel of a real motor car when steering the said car on top of said platform by it.

With these and other objects in view which will become apparent later from this specification and the accompanying drawings, I provide a mechanical toy of the kind described, wherein the magnetic fields of said magnets couple the wheels of said car and carriage to one another for a rolling movement in unison on the said platform, at least one of the wheels of the said car and one of the wheels of the said carriage being steerable and the said steering means being kinematically connected with the steerable wheel of said carriage.

Preferably a magnet is mounted rotatably and connected kinematically to the steerable wheel both in the said car and in the said carriage, the said two magnets being in juxtaposition with and coupled to one another by their magnetic fields. The connection between the said steering means and the steerable wheel of the said carriage is preferably effected by means of a flexible shaft, which may contain an overload slip-clutch. The driving means of said carriage is preferably an electric motor mounted thereon whose circuit includes the said flexible shaft and platform which latter consists of an electrically conductive but non-ferromagnetic material.

In the accompanying drawing:

FIG. 1 is a diagrammatic longitudinal section of the mechanical toy as a whole,

FIG. 2 is a diagrammatic side elevation on a larger scale of the upper car and of the lower carriage, some parts being in section and others being illustrated so far only as required for the understanding of their function, FIG. 3 is a diagrammatic plan view of the steering mechanism of the front wheels of the lower carriage.

According to FIG. 1, the platform 1, on which there is located a movable upper car 2, illustrated as a motor car, is carried by a shrouded structure 3. The upper car 2 has two magnets 4, in juxtaposition with which there are two magnets 5 on the opposite side of the platform 1, which are mounted on a lower carriage 6 (FIG. 2). The magnetic force of these magnets is so strong that it exceeds the weight of the lower carriage 6. Opposite the wheels 7 and 8 of the upper car 2 there are the wheels 9 and 10 of the lower carriage, which can roll on the underside of the platform 1. The platform 1 consists of an electrically conductive but not ferromagnetic material, e.g. aluminum.

The front wheels 9 of the lower carriage 6 are journalled according to FIG. 3 on stub axles 11, which are pivotal about vertical pivot pins 12. Each of these stub axles forms one arm of a bellcrank lever, the other arm of which is denoted 13. The two arms 13 are coupled by a link 14 articulated to them. On one of the pivot pins 12 a pinion 15 is mounted which is in mesh with a spur gear 18.

According to FIG. 2 this spur gear meshes with a pinion 19, which drives a gear 20 which in turn meshes with a pinion 21 mounted on an axle 22, which is connected on the one hand to a flexible shaft 23 and on the other hand to a magnet 24. Opposite this rotatable magnet 24 a corresponding rotatable magnet 25 is mounted on the vehicle 2 which via a gearing 26—29 arranged in mirror-symmetry to the gearing 18—21 is connected to a steering mechanism for the front wheels 7 of the vehicle, which mechanism is likewise arranged in mirror-symmetry to the steering mechanism explained with reference to FIG. 3.

The flexible shaft 23 is connected according to FIG. 1 with a vertical shaft 30 journalled in a bearing bracket 31 mounted below the center of the platform 1. This shaft 30 is driven through a pair of bevel gears 32, a horizontal shaft 33 and a second pair of bevel gears 34 from a shaft 35, on which the steering wheel 36 is mounted. The shaft 35 is journalled in the bearing bracket 37 fixed to the frame 3.

The bevel gear 38 of the pair of bevel gears 34 is not keyed to the shaft 35 but is clamped between two discs 39 and 40, the first of which is fixed to the shaft 35, while the latter is forced against the bevel gear 38 by a spring 41 abutting the collar 42. The components 38—42 form a slip-clutch by which excessive torque moments are prevented from being transmitted to the shaft 33 and accordingly to the flexible shaft 23 and the steering mechanism according to FIG. 3. The shaft 35 may moreover be provided with stops (not shown) in order to limit the possible amplitude of the steering member 36 in accordance with the maximum possible deflection of the front wheels 9 of the carriage 6, or of the front wheels 7 of the vehicle 2, respectively.

A direct current motor 43 is mounted on the carriage 6 for the purpose of driving the shaft of the rear wheels 10 thereof through gearing 44—47.

In a box 48 the main components of the electrical control equipment for the motor 43 are contained, namely a mains connection appliance for converting alternating current into direct current, as well as a series resistor for regulating the voltage supplied to the terminals of the motor. This series resistor is adjusted by means of a pedal 49 in such a manner that by a weak pressure on the pedal the circuit of the motor is closed and that with increasing pressure on the pedal the series resistance is gradually reduced, so that the motor runs faster and faster until with the pedal depressed completely its maximum speed is attained.

A reversal switch 50 with operating lever 51 which is connected by a conductor 52 to the box 48 permits to reverse the direction of the current in the motor and consequently also the direction of driving. The motor circuit is completed, starting from a terminal 53 of the box 48, via a conductor 54, a brush 55, a slipring 56, the shaft 30, the flexible shaft 23, the shaft 22, a conductive bearing bush (not shown in FIG. 2) which is insulated from the chassis of the carriage, a conductor (likewise not shown), the motor 43, the chassis of the carriage, the rear wheels 10, the metal platform 1 and the frame 3 to a second terminal 57 of the box 48. It should be remarked in this connection, that the bearing bracket 31 of the shaft 30 consists of insulating material, and likewise at least one of the gear wheels 32 and the gear wheel 21 consist of insulating material, for example ebonite.

From the above description it follows without difficulty, that on the one hand the starting, the speed and the stopping of the upper car 2 can be controlled by means of the pedal 49, and on the other hand its direction by means of the steering wheel 36, while its forward or reverse drive depends on the position of the lever 51. It should be emphasized that the car 2 is not only carried along magnetically, but that moreover its front wheels 7 are in fact steered. When starting the car 2 from a standstill the player can accordingly guess from the position of the front wheels 7, how he has to steer in order to follow a certain path.

On the visible upper surface of the platform 1 naturally a road network with all sorts of obstacles may be marked out; moreover traffic signals may be arranged and for example operated by hand, and it is then the player's task to steer the car 2 as quickly and faultlessly as possible from one place to another.

Naturally the car 2 need not be designed as a motor car. The term "car" is to be understood in the broadest sense to mean any vehicle provided with wheels. In the case of a tricycle for example, the direction of driving of the single wheel may be steered by means of the rotatable magnets.

The lower end of the flexible shaft 23 need not necessarily be located below the center of the platform 1. This is however, advantageous, since the flexible shaft 23 can then be made particularly short, so that it can follow without undue stress the lower carriage 6 right into the corners of the platform 1, which is for example rectangular. Two extreme positions of the shaft 23 are indicated in FIG. 1 by the chain-dotted lines 23' and 23".

The steering of the front wheels 9 of the lower carriage 6 may be dispensed with, if desired, i.e. the components 13—15 and 18—21 may be omitted. In this case the steering member 36 would be in operative connection, through the flexible shaft 23 with the front wheels 7 of the upper car only.

While I have described herein and illustrated in the accompanying drawings what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A toy, comprising a frame, a platform supported on said frame, a vehicle, wheels rotatably mounted on said vehicle for rolling engagement with the top of said platform, means mounting at least one of said vehicle wheels on said vehicle for pivotal movement about an axis transverse to said platform, a carriage, wheels rotatably mounted on said carriage for rolling engagement with the underside of said platform, means mounting at least one of said carriage wheels for pivotal movement about an axis transverse to said platform, first magnet means in said vehicle, second magnet means on said carriage, said first and second magnet means cooperating to maintain said carriage wheels in engagement with the underside of said platform, manually operable steering means mounted in said frame, means including a rotary flexible shaft operatively connecting said steering means with said pivotally mounted carriage wheel and with said pivotally mounted vehicle wheel, a reversible electric motor for driving said carriage, and manually operable actuating means for said electric motor, whereby said carriage is movable forwardly and backwardly at controllable speeds by said drive motor and at the same time steerable along a desired path by said steering means while said vehicle is caused to follow the same path in the same direction at the same speed on the top of said platform.

2. The toy as set forth in claim 1, wherein said connecting means include a first magnet mounted in said carriage for rotation about an axis transverse to said platform, means connecting said first magnet with said flexible shaft for rotation therewith, means operatively connecting said shaft with said steerable carriage wheel, a second magnet mounted in said vehicle for rotation about said axis transverse to said platform, and means operatively connecting said second magnet with said steerable vehicle wheel, whereby said second magnet is caused to follow the rotary movements of said first magnet and to thereby cause said steerable vehicle wheel to duplicate the steering movements of said carriage wheel.

3. The toy as set forth in claim 1, wherein said connecting means include a substantially vertical shaft secured to the end of said flexible shaft, means rotatively mounting said vertical shaft in said frame below said platform, and means operatively connecting said vertical shaft with said steering means.

4. The toy as set forth in claim 1, including a frictional slip clutch connected in said steering means to automatically prevent overloading.

References Cited in the file of this patent

UNITED STATES PATENTS

| | | |
|---|---|---|
| 2,486,273 | Gibson | Oct. 25, 1949 |
| 2,638,712 | Jackson | May 19, 1953 |
| 2,639,545 | Pastorius | May 26, 1953 |

FOREIGN PATENTS

| | | |
|---|---|---|
| 1,144,200 | France | Apr. 23, 1957 |